United States Patent
Liu et al.

(10) Patent No.: US 12,454,039 B2
(45) Date of Patent: Oct. 28, 2025

(54) METHOD FOR OPERATING A MACHINE TOOL AND MACHINE TOOL

(71) Applicant: Hilti Aktiengesellschaft, Schaan (LI)

(72) Inventors: Qin Liu, Oberschleissheim (DE);
Bernd Gillmeier, Landsberg (DE);
Stefan Schmid, Untermuehlhausen (DE)

(73) Assignee: Hilti Aktiengesellschaft, Schaan (LI)

( * ) Notice: Subject to any disclaimer, the term of this patent is extended or adjusted under 35 U.S.C. 154(b) by 298 days.

(21) Appl. No.: 17/615,198

(22) PCT Filed: Jun. 17, 2020

(86) PCT No.: PCT/EP2020/066749
§ 371 (c)(1),
(2) Date: Nov. 30, 2021

(87) PCT Pub. No.: WO2020/260090
PCT Pub. Date: Dec. 30, 2020

(65) Prior Publication Data
US 2022/0226974 A1    Jul. 21, 2022

(30) Foreign Application Priority Data

Jun. 27, 2019  (EP) ..................... 19182847

(51) Int. Cl.
*B25F 5/00* (2006.01)
*B25B 23/147* (2006.01)

(52) U.S. Cl.
CPC ............ *B25B 23/147* (2013.01); *B25F 5/001* (2013.01)

(58) Field of Classification Search
CPC ................. B25B 23/147; B25F 5/001
See application file for complete search history.

(56) References Cited

U.S. PATENT DOCUMENTS

| 4,110,829 A | 8/1978 | Boys et al. |
| 4,938,109 A | 7/1990 | Torres et al. |

(Continued)

FOREIGN PATENT DOCUMENTS

| CN | 101714647 A | 5/2010 |
| CN | 101771379 A | 7/2010 |

(Continued)

OTHER PUBLICATIONS

International Search Report of PCT/EP2020/066749, dated Sep. 18, 2020.

(Continued)

*Primary Examiner* — Gloria R Weeks
(74) *Attorney, Agent, or Firm* — Davidson Kappel LLC

(57) ABSTRACT

A method for operating a machine tool having a battery and an electric motor which is designed to rotationally drive an output shaft that can be coupled to a tool, is described, a control device for actuating the electric motor and a device for determining a parameter being provided. The machine tool can be operated in a first operating mode and a second operating mode, the machine tool being transferred from the first operating mode into the second operating mode if the parameter determined by the device exceeds or falls below a defined threshold value. In the second operating mode, the electric motor is controlled by an amperage profile, the amperage profile comprising first current pulses (10) and second current pulses (11). The level of a maximum amperage (A1) of the first current pulses (10) is greater than the level of a maximum amperage (A2) of the second current pulses (11). A machine tool that can be operated using a method of this kind is also described.

20 Claims, 4 Drawing Sheets

(56) References Cited

U.S. PATENT DOCUMENTS

| | | | |
|---|---|---|---|
| 6,286,609 B1* | 9/2001 | Carrier | H02P 7/291 |
| | | | 173/217 |
| 6,479,958 B1* | 11/2002 | Thompson | B25F 5/00 |
| | | | 388/937 |
| 6,508,313 B1 | 1/2003 | Carney et al. | |
| 7,410,006 B2 | 8/2008 | Zhang et al. | |
| 7,552,781 B2 | 6/2009 | Zhang et al. | |
| 7,789,169 B2 | 9/2010 | Berry et al. | |
| 8,418,778 B2 | 4/2013 | Eshleman et al. | |
| 9,364,944 B2 | 6/2016 | Aoki et al. | |
| 9,475,180 B2 | 10/2016 | Eshleman et al. | |
| 11,759,224 B2 | 9/2023 | Shelton, Iv et al. | |
| 2002/0153856 A1* | 10/2002 | Gilmore | B25B 23/147 |
| | | | 318/599 |
| 2004/0226728 A1 | 11/2004 | Boeni et al. | |
| 2005/0073282 A1 | 4/2005 | Carrier et al. | |
| 2006/0081386 A1* | 4/2006 | Zhang | B25B 21/00 |
| | | | 173/2 |
| 2006/0222930 A1 | 10/2006 | Aradachi et al. | |
| 2006/0233621 A1 | 10/2006 | Schell et al. | |
| 2007/0089484 A1 | 4/2007 | Bailey et al. | |
| 2009/0101379 A1* | 4/2009 | Du | H02P 7/29 |
| | | | 173/176 |
| 2010/0084150 A1 | 4/2010 | Suzuki et al. | |
| 2010/0198220 A1 | 8/2010 | Boudreaux et al. | |
| 2010/0218966 A1 | 9/2010 | Liebhard et al. | |
| 2010/0265097 A1 | 10/2010 | Obatake et al. | |
| 2010/0320252 A1 | 12/2010 | Viola et al. | |
| 2011/0022032 A1 | 1/2011 | Zemlok et al. | |
| 2011/0162860 A1 | 7/2011 | Gut et al. | |
| 2011/0214894 A1 | 9/2011 | Harada et al. | |
| 2011/0303427 A1 | 12/2011 | Tang et al. | |
| 2012/0103643 A1* | 5/2012 | Binder | B25F 5/001 |
| | | | 173/1 |
| 2012/0199372 A1* | 8/2012 | Nishikawa | B25B 21/02 |
| | | | 173/132 |
| 2012/0225328 A1 | 9/2012 | Nakanouchi et al. | |
| 2012/0279736 A1 | 11/2012 | Tanimoto et al. | |
| 2013/0014967 A1* | 1/2013 | Ito | B25F 5/00 |
| | | | 173/93 |
| 2013/0037288 A1* | 2/2013 | Schell | B25F 5/001 |
| | | | 173/176 |
| 2013/0261681 A1 | 10/2013 | Bittenson et al. | |
| 2014/0008090 A1 | 1/2014 | Kokinelis et al. | |
| 2014/0028226 A1 | 1/2014 | Mergener et al. | |
| 2014/0102741 A1* | 4/2014 | Sekino | B25B 21/02 |
| | | | 173/181 |
| 2014/0352992 A1 | 12/2014 | Wu et al. | |
| 2015/0041164 A1* | 2/2015 | Sergyeyenko | B25B 23/147 |
| | | | 173/176 |
| 2015/0053749 A1 | 2/2015 | Shelton, IV et al. | |
| 2015/0306748 A1 | 10/2015 | Hsu et al. | |
| 2016/0342151 A1 | 11/2016 | Dey, IV et al. | |
| 2017/0047819 A1 | 2/2017 | Forster et al. | |
| 2017/0202605 A1 | 7/2017 | Shelton, IV et al. | |
| 2017/0246732 A1* | 8/2017 | Dey, IV | B25B 23/1475 |
| 2017/0281187 A1 | 10/2017 | Shelton, IV et al. | |
| 2017/0296185 A1 | 10/2017 | Swensgard et al. | |
| 2018/0132850 A1 | 5/2018 | Leimbach et al. | |
| 2018/0290275 A1 | 10/2018 | Asplund et al. | |
| 2018/0304453 A1 | 10/2018 | Schaer et al. | |
| 2019/0143501 A1 | 5/2019 | Wong et al. | |
| 2019/0190303 A1 | 6/2019 | Geng et al. | |
| 2019/0227528 A1 | 7/2019 | Abbott et al. | |
| 2020/0052479 A1 | 2/2020 | Friedman et al. | |
| 2021/0229259 A1 | 7/2021 | Dey, IV et al. | |
| 2022/0226974 A1 | 7/2022 | Liu et al. | |

FOREIGN PATENT DOCUMENTS

| | | |
|---|---|---|
| CN | 102528770 A | 7/2012 |
| CN | 102639301 A | 8/2012 |
| CN | 102770248 A | 11/2012 |
| CN | 102794732 A | 11/2012 |
| CN | 104218868 A | 12/2014 |
| CN | 108136571 A | 6/2018 |
| DE | 102010003977 A1 | 7/2011 |
| EP | 2338646 A2 | 6/2011 |
| EP | 3170624 A1 | 5/2017 |
| EP | 3231371 A1 | 10/2017 |
| JP | 2002335633 A | 11/2002 |
| JP | 2005324887 A | 11/2005 |
| JP | 2011212803 A | 10/2011 |
| WO | WO 2011122695 A1 | 10/2011 |
| WO | WO 2020/260088 A1 | 12/2020 |

OTHER PUBLICATIONS

International Search Report of PCT/EP2020/066743, dated Sep. 25, 2020.

Song Qingshan & Discussion on fast charging of Ni—Cd batteries, electronic industry, vol. 10, Issue 4, Publishing date: Sep. 29, 2005; pp. 217-218, see machine translation.

* cited by examiner

METHOD FOR OPERATING A MACHINE TOOL AND MACHINE TOOL

BACKGROUND

In machine tools known from practice, which are designed to have a regulated electric motor that can be operated by a battery, an output torque applied to an output shaft increases and thus a motor current required to provide this output torque increases, for example when drilling a hole of which the drilling depth increases, in order to provide the correspondingly increasing output torque and to maintain a desired rotational speed of a rotor of the electric motor. If a braking torque applied to the output shaft surpasses a performance capacity of the electric motor, the rotor stops, even if the motor current increases. The locked rotor and the high amperage that is applied can damage the electronics and/or the electric motor if there is no hardware protection or software protection present. Likewise, an output shaft can suddenly lock, for example when drilling in a hard surface. As a result, an applied amperage suddenly increases.

In order to prevent damage to the machine tool in these cases, it is known to provide mechanical couplings which decouple the output shaft from the electric motor when a defined output torque is applied to the output shaft, such that the rotor of the electric motor can continue to rotate without the torque that is applied to the output shaft being transmitted to the electric motor.

SUMMARY OF THE INVENTION

However, a mechanical coupling is characterized by a high weight, requires space, and has a negative impact on the manufacturing costs of the machine tool. In addition, the mechanical components are subject to wear and may need to be serviced or replaced. Wear of the mechanical coupling can disadvantageously change a release torque of the coupling, such that a maximum possible release torque of the coupling can decrease during the operation of the coupling. Furthermore, the mechanical coupling could also not work to the desired extent.

In order to eliminate these disadvantages, machine tools having an electronically implemented coupling are known from practice, which coupling is implemented by correspondingly controlling the electric motor, signals from the electric motor being determined and evaluated for this purpose, for example. After a release event has been detected, for example a torque that is applied to the output shaft which exceeds a defined threshold value, or a sudden braking of the drive shaft which is greater than a defined threshold value, or a speed applied to the output shaft which does not reach a minimum threshold value in a defined time interval during startup due to the tool becoming locked, the electric motor is transferred from a first operating mode into a second operating mode in which current pulses are applied to the electric motor. These current pulses give the user haptic feedback that is modeled on and preferably resembles that of a machine tool having a mechanical coupling. In addition, the discontinuous current pulses facilitate the release of a locked tool, which is coupled to the output shaft, in the surface. When the output shaft is free again, the motor torque surpasses the braking torque applied to the output shaft, the rotational speed of the rotor of the electric motor increases, and the electric motor is transferred back into the first operating state.

The operation of the electric motor in the second operating state is disadvantageously very energy-intensive and results in a rapid decrease in the charge level of the battery and can result in undesired overheating of the electric motor if not sufficiently cooled.

The present invention provides a method for operating a machine tool and a machine tool, the machine tool giving the user haptic feedback in the second operating mode and it being possible for the machine tool to be operated in an energy-efficient manner.

Therefore, a method for operating a machine tool having a battery and an electric motor is provided, the electric motor being designed to rotationally drive an output shaft that can be coupled to a tool, a control device for actuating the electric motor and a device for determining a parameter being provided, it being possible for the machine tool to be operated in a first operating mode and a second operating mode, and the machine tool being transferred from the first operating mode into the second operating mode when the parameter determined by the device exceeds or falls below a defined threshold value.

According to the invention, the electric motor can be controlled in the second operating mode by a preferably regulated and in particular specified amperage profile and/or amperage curve, the amperage profile comprising first current pulses and second current pulses, the level of a maximum amperage of the first current pulses being greater than the level of a maximum amperage of the second current pulse.

A machine tool operated using a method according to the invention provides, in a simple manner, a user with haptic feedback comparable to a machine tool having a mechanical coupling, for example in the event of the drive shaft being locked, even without a mechanical coupling being provided. In addition, a machine tool operated using a method according to the invention can advantageously be operated for a long time in the second operating mode by providing the different current pulses with different maximum amperages in comparison to a machine tool to which high current pulses that are in each case identical are applied in the second operating mode for releasing the output shaft. If the machine tool is provided for machining a hard material, the tool coupled to the output shaft, for example a bit, a screwdriver, a drill or the like, can stop abruptly. When the machine tool is used for machining a soft material but also a hard material as the drilling progresses, a torque applied to the output shaft increases until said torque reaches a permissible threshold torque. Furthermore, the output shaft can also not reach a defined minimum speed in a specified time interval during startup and therefore, for example, a drill is detected that was already detected at the start of a machining process. In these cases, the machine tool is transferred from the first operating mode into the second operating mode.

By providing the first and second current pulses with different maximum amperages, the machine tool is operated in a particularly energy-efficient manner in the second operating mode, the first current pulses being provided with the larger maximum amperage in order to release the output shaft or a tool coupled to the output shaft from the particular surface. In contrast, the second current pulses are provided with the smaller maximum amperage in order to provide the user, in the second operating mode of the machine tool, with haptic feedback comparable to a machine tool designed so as to have a mechanical coupling when the coupling is released. It was found that lower maximum amperages are sufficient for this purpose. A sequence of first current pulses and second current pulses takes place, in particular on the basis of a specified pattern.

In an advantageous embodiment of a method according to the invention, the electric motor is controlled in the second operating mode alternately by a defined number of first current pulses and a defined number of second current pulses, this sequence in particular being repeated. The defined sequence achieves, in a simple manner, desired haptic feedback and a desired torque transmitted to the output shaft in an energy-efficient manner, which torque is provided, for example, in order to release a tool which is locked in a surface.

It is particularly advantageous, with regard to haptic feedback and to power consumption, if the electric motor is controlled in the second operating mode alternately by a first current pulse and then a plurality of second current pulses, in particular two to twenty, preferably five to fourteen, more preferably eight to ten, in particular nine second current pulses.

In order to be able to transmit as large a torque as desired to the output shaft in the second operating mode and at the same time to achieve low power consumption, it is advantageous if the electric motor is controlled in the second operating mode such that the length of the first current pulses differs from a length of the second current pulses, the first current pulses in particular being longer than the second current pulses, and preferably being substantially twice as long as the second current pulses. This is based on the knowledge that short second current pulses compared with the first current pulse are sufficient in order to achieve desired haptic feedback, whereas longer current pulses are useful for releasing the tool.

A time interval between successive current pulses can correspond in particular to a length of the first current pulse. An interval between all of the current pulses can be substantially identical.

It is particularly energy efficient if the electric motor is controlled in the second operating mode such that the maximum amperage of the first current pulses is between 25% and 80% larger, particularly preferably substantially 50% larger than the maximum amperage of the second current pulses. The ratio of the maximum amperage of the first current pulses to the maximum amperage of the second current pulses can also change throughout.

In order to prevent, in a simple manner, a voltage from falling below a defined threshold in the second operating mode in the course of operating the machine tool and/or to provide a particularly energy-efficient method, in an advantageous embodiment of a method according to the invention, the electric motor is controlled in the second operating mode such that a maximum level of the first current pulse and/or a maximum level of the second current pulse is varied depending on a current charging status of the battery, and preferably decreases.

The maximum level of the first current pulse and/or the maximum level of the second current pulse can be discretely, i.e. for example in steps, or, in particular in the case of continuous monitoring of the charge status of the battery, continuously adapted depending on the charge status of the battery.

If a transition of the machine tool from the first operating mode into the second operating mode is provided, it is advantageous if, proceeding from a first operating mode of the machine tool, an amperage substantially equal to the value zero is applied to the electric motor for a defined period of time before a transition into the second operating mode, and the electric motor in particular is stopped.

For example, in order to be able to continue a drilling process after releasing a drill from the surface, in an advantageous embodiment of a method according to the invention, the machine tool is transferred from the second operating mode into the first operating mode when a torque which is determined by the device and applied to the output shaft is smaller than a threshold torque. In this case, the electric motor can be accelerated to a desired speed by means of a specified ramp, for example.

In order to protect the electric motor from damage, the electric motor can be stopped if the electric motor is in the second operating mode over a period of time greater than a predefined threshold value. As a result, the machine tool is protected in particular from damage due to overheating of components of the machine tool, in particular electronics, a rotor, or turns of the electric motor.

In an advantageous embodiment of the invention, the device is designed to determine a torque applied to the output shaft, the machine tool being operated in the first operating mode when the torque determined by the device is less than a defined threshold torque, and the control device transferring the machine tool from the first operating mode into the second operating mode when the torque determined by the device exceeds the defined threshold torque. The determined torque corresponds to the parameter determined by the device. The device can be designed as an algorithm stored in the control device, which calculates or estimates the torque applied to the output shaft on the basis of input parameters such as, for example, a motor speed and an actually present amperage.

Furthermore, the device can be designed to determine an acceleration value of the output shaft, the machine tool being transferred from the first operating mode into the second operating mode if the determined acceleration value of the output shaft exceeds a defined negative acceleration value and the output shaft is therefore braked more strongly than a defined value. This can occur in particular if, for example, a drill is locked in a hard surface. The determined acceleration corresponds to the parameter determined by the device.

Furthermore, the parameter determined by the device can be a rotational speed of the drive shaft, the machine tool being transferred from the first operating mode into the second operating mode if a rotational speed of a motor shaft or of the output shaft does not reach a defined threshold speed after a specified period of time. As a result, it can be determined in particular if, for example, a tool that is coupled to the output shaft is already locked in a surface at the beginning of a machining process.

The present invention also provides a machine tool having a battery, an electric motor which is designed to rotationally drive an output shaft that can be coupled to a tool, a control device for actuating the electric motor, and a device for determining a parameter, the machine tool being operated using a method described in more detail above.

A machine tool according to the invention has the advantage that it can provide a user with haptic feedback comparable to that of a machine tool having a mechanical coupling, in a structurally simple, inexpensive, weight-optimized and energy-efficient manner, in the event that a braking torque applied to the output shaft is greater than a defined threshold torque and releases the mechanical coupling.

By providing the first and second current pulses with different maximum amperages, the machine tool is operated in a particularly energy-efficient manner in the second operating mode, the first current pulses being provided with the larger maximum amperage in order to release the output shaft or the tool coupled to the output shaft from the particular surface. In contrast, the second current pulses are provided with the smaller maximum amperage in order to provide the user, in particular in this state, with haptic feedback comparable to a machine tool designed so as to have a mechanical coupling, which machine tool is in the triggered state; it was found that lower maximum amperages are sufficient for this purpose. A sequence of first current pulses and second current pulses takes place, in particular on the basis of a specified pattern.

Further advantages can be found in the following description of the drawings. Various embodiments of the present invention are shown in the drawings. The drawings, the description and the claims contain numerous features in combination. A person skilled in the art will expediently also consider the features individually and combine them to form meaningful further combinations.

In the drawings, identical and equivalent components are provided with the same reference signs.

DETAILED DESCRIPTION

Figure 1:
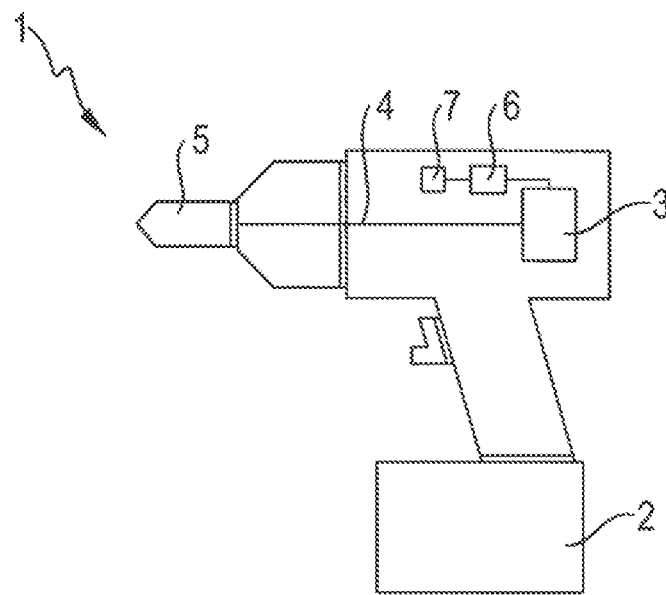
FIG. 1 is a greatly simplified representation of a machine tool having a battery, an electric motor and a control device for actuating the electric motor.

FIG. 1 is an exemplary flow diagram of an embodiment of a method according to the invention for operating a machine tool 1, in particular a cordless screwdriver, a drilling machine or the like. The machine tool 1 has a battery 2, which is provided in order to supply power to an electric motor 3 of the machine tool 1. The electric motor 3 is designed to rotationally drive an output shaft 4 of the machine tool 1, it being possible for the output shaft 4 to be coupled to a tool 5, for example a bit, a drill or the like. The machine tool 1 also has a control device 6 for actuating the electric motor 3, the control device 6 being designed to actuate the electric motor 3 in a controlled manner on the basis of an amperage. The machine tool 1 also has a device 7 for determining a parameter of the machine tool 1, in particular a torque applied to the output shaft 4 and/or an acceleration value of the output shaft 4. The machine tool 1 is designed so as to not have a mechanical coupling, such that the electric motor 3 is operatively connected directly to the output shaft 4, optionally by means of an interposed gear.

The machine tool 1 can be operated in a first operating mode and in a second operating mode. This is discussed in more detail below.

The method begins with the start S. In a first step S1, the machine tool 1 is operated in accordance with a user request in the first operating mode which corresponds, for example, to a normal drilling mode.

In a second step S2, the device 7 detects a defined operating state in which continued operation in the first operating mode can, for example, damage the electric motor 3, in particular as a result of overheating. In this case, the device 7 detects or determines, for example, an undesirably high braking torque applied to the output shaft 4 of the tool 5 which exceeds a specified threshold value or a threshold torque. This can occur, for example, when drilling a hole at an advanced borehole depth. Alternatively, the defined operating state can be detected by the device 7 in that the determined absolute value of the acceleration of the output shaft 4 is greater than a defined threshold value and the tool 5 thus experiences a defined braking. This can occur, for example, when a tool 5 becomes locked.

The device 7 can be designed, for example, as an algorithm stored in the control device 6, which determines or calculates or estimates a parameter directly or indirectly from other input values and compares said parameter with a defined threshold value. The parameter can be, for example, the torque applied to the output shaft 4 or an acceleration value of the output shaft 4.

After a corresponding detection of the defined operating state, the electric motor 3 is braked to a speed $n_{mot}$ substantially equal to zero by the control device 6 in step S3.

The control device 6 then transfers the machine tool 1 into the second operating mode in step S4, which has the purpose of releasing the tool 5 and providing haptic feedback to the user which is comparable to a machine tool having a mechanical coupling. The second operating mode is discussed in more detail below.

After the tool 5 has in particular been released again, i.e. if, for example, the device 7 detects that a torque applied to the output shaft 4 is less than a defined torque value, in step S5 the control device 6 transfers the machine tool 1 back into the first operating mode, and in step S6 it is checked in turn whether a defined operating state as described above occurs again.

In step E, the method is ended, for example, as requested by the user.

Figure 2:
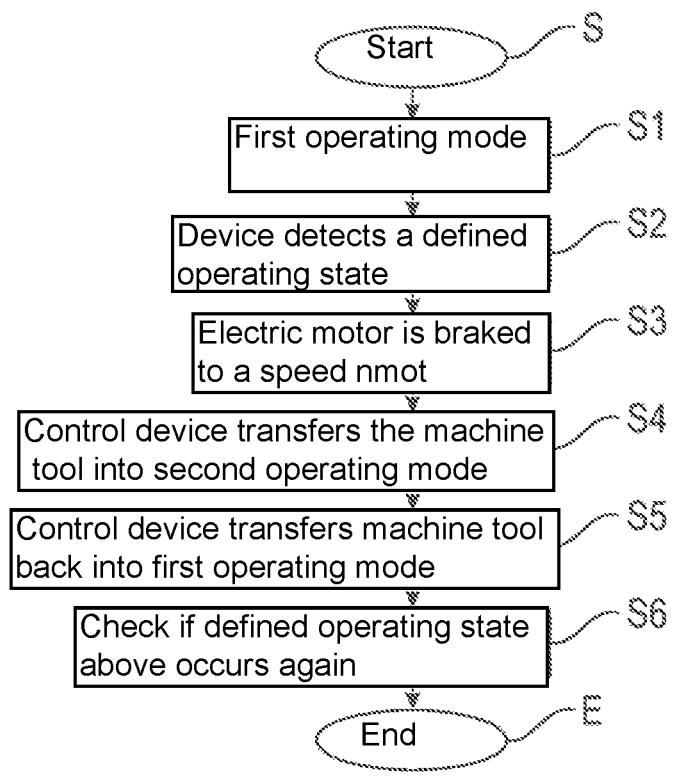
FIG. 2 is a simplified flow diagram of a method for operating the machine tool according to FIG. 1.

FIG. 2 shows an exemplary sequence of a drilling process, the curve of the motor speed $n_{mot}$ being shown in the upper diagram and an actual curve of the amperage A over time being shown in the lower diagram. The amperage curve substantially corresponds to a curve of a torque applied to the output shaft 4.

The machine tool 1 is operated in a first phase P1 in the first operating mode, the motor speed $n_{mot}$ substantially constantly assuming an operating value $n_{mot1}$ and the amperage A which is required for operating the electric motor 3 being below a threshold value $A_{threshold}$. An applied load torque can also be estimated in the control device 6 instead of the amperage A.

At a point in time t1, the amperage A increases up to the threshold value $A_{threshold}$ and/or the estimated load torque increases up to a threshold value $M_{threshold}$. This is due, for example, to the fact that the tool 5 enters deeper into a surface and/or the tool 5 locks and becomes stuck in a surface. The defined operating state is determined by the control device 6. In order to protect the electric motor 3 from overheating or other damage, the motor speed $n_{mot}$ is subsequently substantially set to the value zero in a second phase P2 up to the point in time t2.

Figure 4:
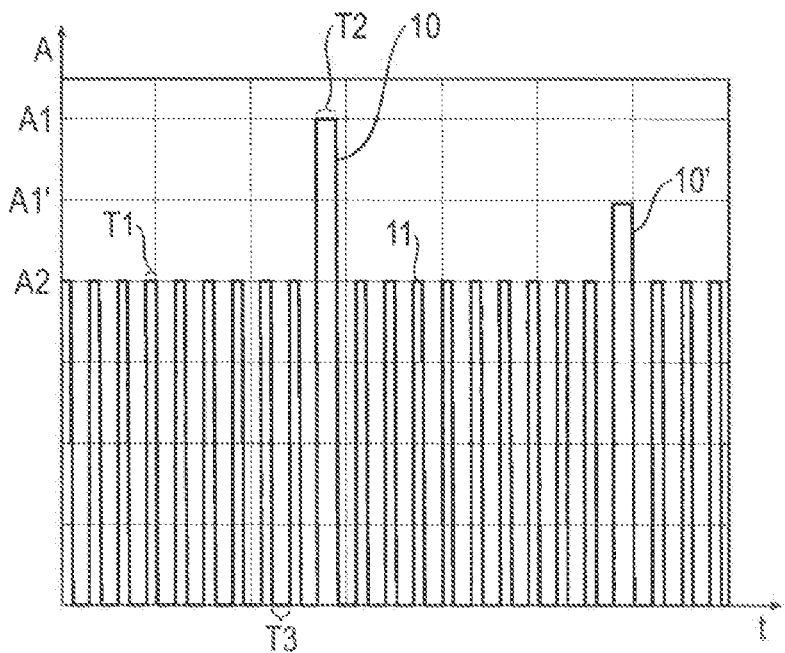
FIG. 4 is a simplified view of a portion of an amperage profile to which the electric motor is controlled in the second operating mode by a control device.

In the following third phase P3, the machine tool 1 is transferred from the first operating mode into the second operating mode, in which the control device 6 acts on the electric motor 3 using a predefined amperage profile, a portion of which is shown in FIG. 4.

The electric motor 3 is controlled by the control device 6 in the second operating mode on the basis of the amperage profile, of which a portion is shown in FIG. 4, or is regulated to this amperage profile. The amperage profile has first current pulses 10 and second current pulses 11, which in the present case are designed as rectangular pulses having a constant maximum amperage in each case. The maximum amperage A1 of the first current pulses 10 is substantially constant for all of the first current pulses 10, the amperage A1 in the present case being approximately 50% larger than a maximum amperage A2 of the second current pulses 11, which in turn are substantially constant for all of the second current pulses 11. The first current pulses 10 extend over a first period of time T1, which in the present case is substantially twice as long as a period of time T2 of the second current pulses 11. A period of time T3 between two successive current pulses 10, 11 in the present case substantially corresponds to the period of time T1 of the first current pulse 10.

In the amperage profile, nine second current pulses 11 follow a first current pulse 10 in the present case. It has been found that this results in a favorable compromise between desired haptic feedback to the user which is comparable to that of a machine tool having a releasing mechanical coupling, and low power consumption. In particular, the first current pulses 10 apply a torque to the output shaft 4, which is intended to release the tool 5 from the locked situation.

Figure 3:
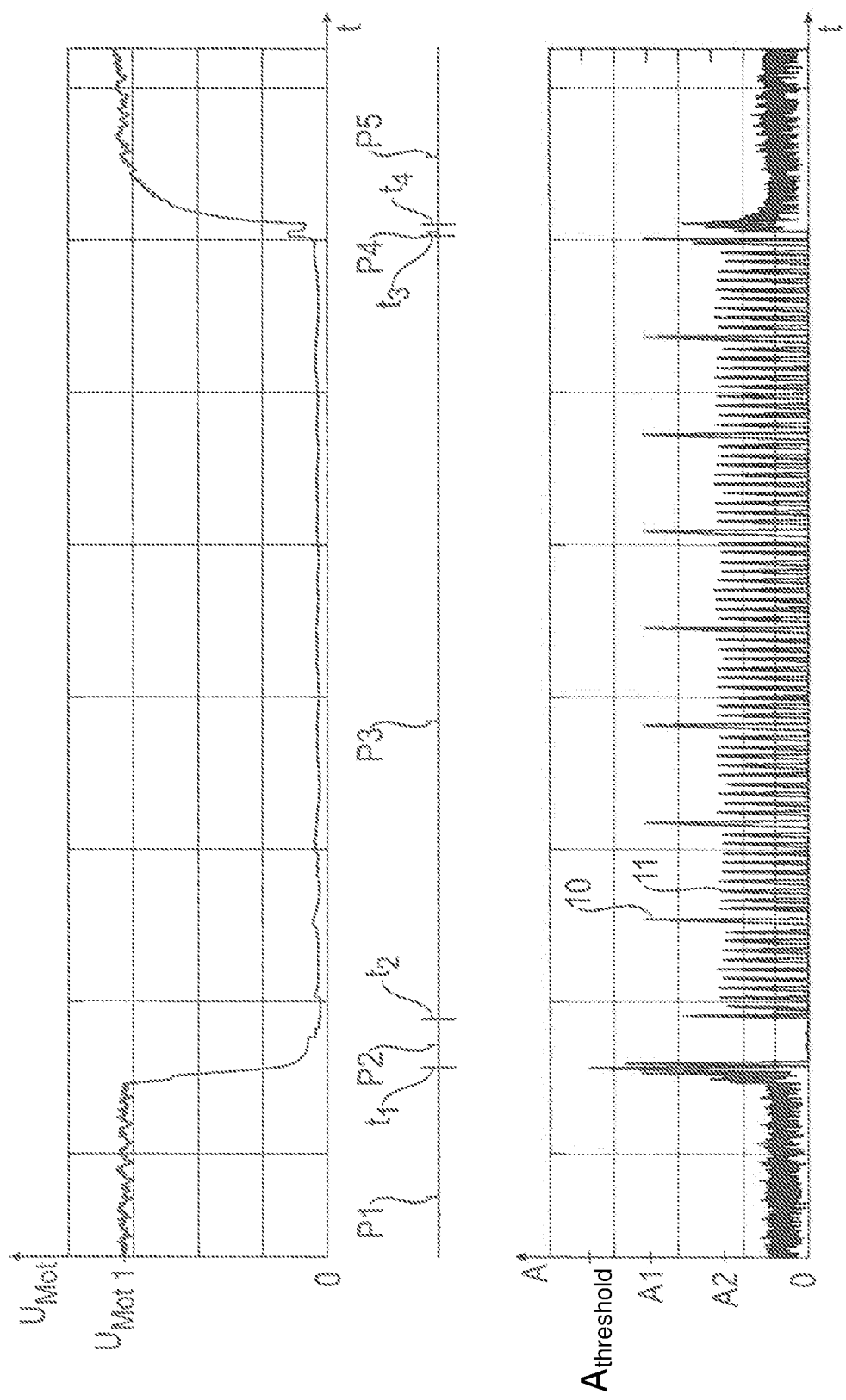
FIG. 3 shows simplified diagrams which represent, over a period of time, a speed of an electric motor and an amperage which acts on the electric motor, the diagrams showing the operation of the machine tool first in a first operating mode, then in a second operating mode and finally in the first mode of operation again.

At a point in time t3 in the diagrams according to FIG. 3, the motor speed $n_{mot}$ increases up to the point in time t4 in a fourth phase P4, this being due to the locking situation of the tool being removed. Subsequently, the machine tool 1 is returned to the first operating state by the control device 6 in a fifth phase P5 starting from the point in time t4, the motor speed $n_{mot}$ being returned to the value $n_{mot1}$ after an acceleration phase.

If, alternatively, the operation of the machine tool 1 over a defined period of time does not result in a lockage of the tool 5 being released, the electric motor 3 can be stopped in order to prevent the electric motor 3 from overheating.

Figure 5:
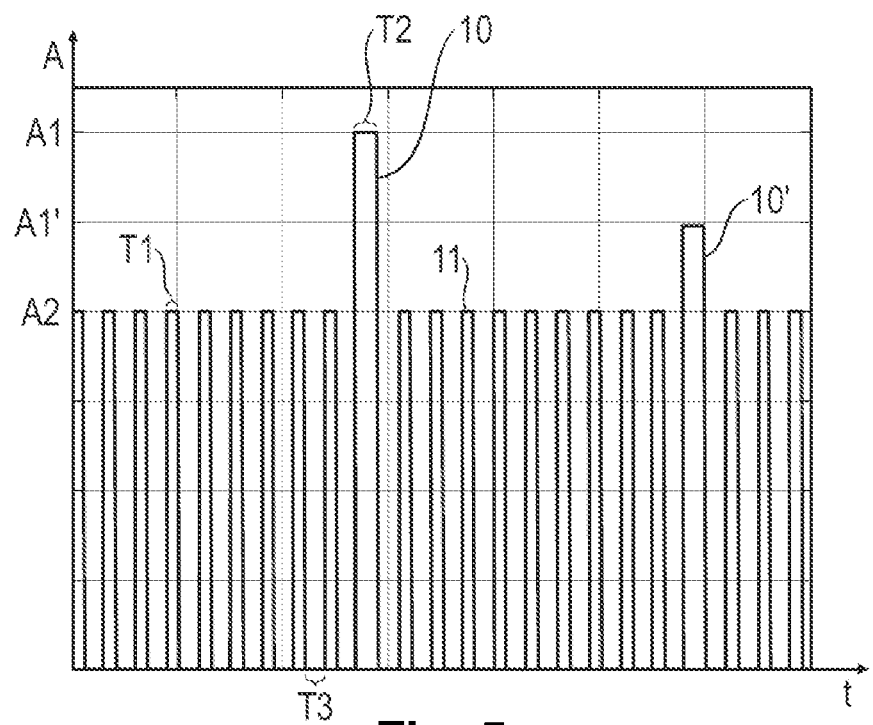
FIG. 5 is a simplified view of a portion of an alternative amperage profile to which the electric motor is controlled by a control device in the second operating mode.
Figure 6:
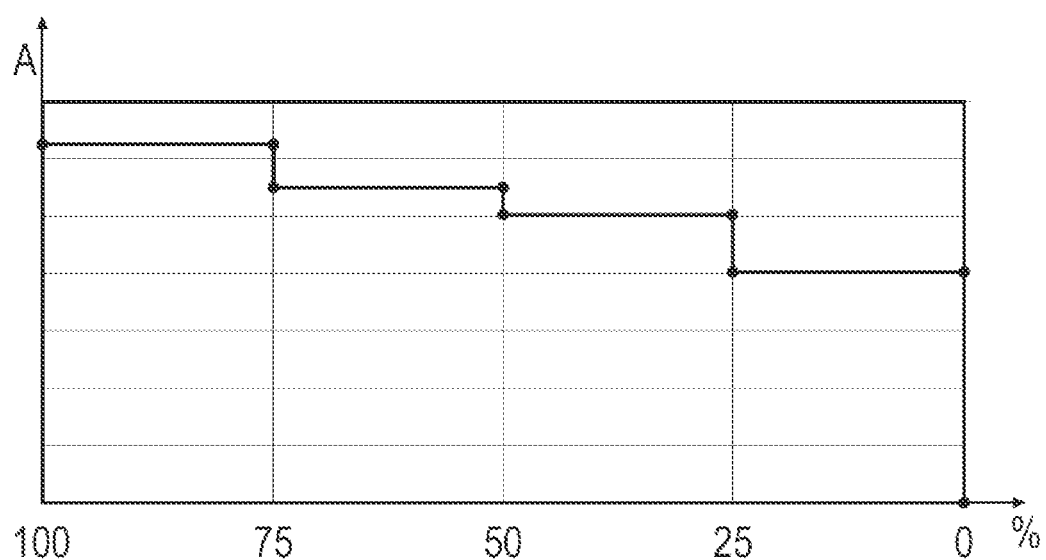
FIG. 6 is a simplified view of a relationship between a charge state of a battery of the machine tool and a maximum amperage of a current pulse of an amperage profile.

FIG. 5 shows an alternatively designed amperage profile which substantially corresponds to the amperage profile according to FIG. 4, with the difference that a maximum amperage of the first pulses 10 is not constant over time. In the amperage profile according to FIG. 5, the maximum amperage of the first current pulses 10 decreases depending on the charge state of the battery 2, a further first current pulses 10' having a maximum amperage A1' smaller than the maximum amperage A1. FIG. 6 shows an example of a dependence of the maximum amperage of the first current pulses 10 on the charge state of the battery 2, the maximum amperage of the first current pulses 10 decreasing in the present case in discrete values as the charge state of the battery 2 decreases. The charge state of the battery 2 is shown in FIG. 5 as a percentage of a maximum charge state of the battery 2.

Alternatively, the maximum amperage of the first current pulses 10 can also decrease substantially continuously when contemporary or actual information regarding the charge state of the battery 2 is available.

Alternatively or in addition, the maximum amperage of the second current pulses 11 can also decrease depending on the charge state of the battery 2.

LIST OF REFERENCE SIGNS

1 Machine tool
2 Battery
3 Electric motor
4 Output shaft
5 Tool
6 Control device
7 Device
10, 10' First current pulse
11 Second current pulses
$A_{threshold}$ Threshold value
A1, A1', A2 Maximum amperage
$n_{mot}$ Motor speed
$n_{mot1}$ Operating value of the motor speed
E, S, S1-S6 Method step
P1-P4 Phase
T1, T2, T3 Period of time
t1 to t5 Point in time

What is claimed is:

1. A method for operating a machine tool having a battery, an electric motor designed to rotationally drive an output shaft couplable to a tool, a controller for actuating the electric motor and a determinator for determining a parameter, the machine tool operable in a first operating mode and a second operating mode, the method comprising:
    transferring the machine tool from the first operating mode into the second operating mode if the parameter exceeds or falls below a defined threshold value, and
    controlling the electric motor in the second operating mode after the transferring step by an amperage profile, the amperage profile including at least one first current pulse and at least one second current pulse, a maximum amperage of the first current pulse being greater than a maximum amperage of the second pulse;
    wherein the electric motor is controlled in the second operating mode to repeat a sequence of one of the at least one first current pulse followed by a plurality of the at least one second current pulse.

2. The method as recited in claim 1 wherein the electric motor is controlled in the second operating mode by repeating the one first current pulse and a defined number of the plurality of second current pulses.

3. The method as recited in claim 1 wherein a number of the plurality of second current pulses is two to twenty.

4. The method as recited in claim 3 wherein a number of the plurality of second current pulses is five to fourteen.

5. The method as recited in claim 4 wherein a number of the plurality of second current pulses is eight to ten.

6. The method as recited in claim 1 wherein the electric motor is controlled in the second operating mode such that a length of the first current pulses differs from a length of the second current pulses.

7. The method as recited in claim 6 wherein the first current pulses are longer than the second current pulses.

8. The method as recited in claim 7 wherein the first current pulses are twice as long as the second current pulses.

9. The method as recited in claim 1 wherein the electric motor is controlled in the second operating mode such that the maximum amperage of the first current pulses is between 25% and 80% larger than the maximum amperage of the second current pulses.

10. The method as recited in claim 9 wherein the electric motor is controlled in the second operating mode such that the maximum amperage of the first current pulses is 50% larger than the maximum amperage of the second current pulses.

11. The method as recited in claim 1 wherein the electric motor controlled in the second operating mode such that the maximum amperage of the first current pulse or a maximum amperage of the second current pulse varies depending on the actual charge status of the battery.

12. The method as recited in claim 1 wherein the maximum amperage of the first current pulse or the maximum amperage of the second current pulse is adjusted discretely or continuously depending on the charge status of the battery.

13. The method as recited in claim 1 wherein proceeding from the first operating mode of the machine tool, an amperage substantially equal to the value zero is applied to the electric motor for a defined period of time before a transition into the second operating mode.

14. The method as recited in claim 1 further comprising transferring the machine tool from the second operating mode into the first operating mode when a torque determined by the determinator and applied to the output shaft becomes less than a threshold torque.

15. The method as recited in claim 1 further comprising stopping the electric motor when the machine tool is in the second operating mode for a period of time greater than a predefined threshold value.

16. The method as recited in claim 1 wherein the parameter determined by the determinator is a torque applied to the output shaft, the machine tool being operated in the first operating mode when the determined torque is less than a defined threshold torque, and the machine tool being transferred from the first operating mode into the second operating mode when the determined torque exceeds the defined threshold torque.

17. The method as recited in claim 1 wherein the parameter determined by the determinator is an acceleration value of the output shaft, the machine tool being transferred from the first operating mode into the second operating mode when the determined acceleration exceeds a defined negative acceleration value.

18. The method as recited in claim 1 wherein the parameter determined by the determinator is a speed of the drive shaft, the machine tool being transferred from the first operating mode into the second operating mode if a speed does not reach a defined threshold speed after a specified period of time.

19. A machine tool comprising: a battery; an electric motor designed to rotationally drive an output shaft couplable to a tool; a controller for actuating the electric motor, and a determinator for determining a parameter, the machine tool being operated according to the method as recited in claim 1.

20. The method as recited in claim 1 wherein the parameter is an amperage and the amperage increases up to the defined threshold value when the tool locks and becomes stuck in a surface, a motor speed being subsequently set to zero for a predefined period of time prior to the second operating mode.

* * * * *